United States Patent [19]

Saito et al.

[11] Patent Number: 4,862,982
[45] Date of Patent: Sep. 5, 1989

[54] TORQUE DETECTOR FOR MOTOR-DRIVEN POWER STEERING SYSTEM

[75] Inventors: Naoki Saito, Gunma; Yasuaki Hata, Hyogo; Hajime Kozuka; Kazuo Mitarai, both of Aichi, all of Japan

[73] Assignees: Mitsubishi Denki Kabushiki Kaisha; Nippon Seiko Kabushiki Kaisha, both of Tokyo, Japan

[21] Appl. No.: 142,573

[22] Filed: Jan. 11, 1988

[30] Foreign Application Priority Data

Jan. 10, 1987 [JP] Japan .............................. 62-2167[U]
Jan. 10, 1987 [JP] Japan .............................. 62-2168[U]

[51] Int. Cl.[4] ............................................. B62D 5/04
[52] U.S. Cl. .............................. 180/79.1; 73/862.31; 73/862.33
[58] Field of Search .............................. 180/79.1, 79; 73/862.33, 862.31

[56] References Cited

U.S. PATENT DOCUMENTS

| | | | |
|---|---|---|---|
| 3,190,113 | 6/1965 | Richmond | 73/862.31 X |
| 4,448,275 | 5/1984 | Kitagawa et al. | 73/862.33 X |
| 4,635,741 | 1/1987 | Morishita et al. | 180/79.1 |
| 4,676,331 | 6/1987 | Iwaki et al. | 180/79.1 |
| 4,681,182 | 7/1987 | Suzuki et al. | 180/79.1 |
| 4,724,711 | 2/1988 | Sakakibara et al. | 180/79.1 X |
| 4,724,917 | 2/1988 | Naito et al. | 180/79.1 |
| 4,778,022 | 10/1988 | Kamiya | 180/79.1 |

Primary Examiner—Mitchell J. Hill
Attorney, Agent, or Firm—Sughrue, Mion, Zinn, Macpeak & Seas

[57] ABSTRACT

A torque detector for a motor-driven power steering system wherein a drive lever that engages the outer circumference of a second ring gear and a detection lever on a potentiometer for detecting a linear displacement of the drive lever are connected via a spool, and a pin supported in the spool is coupled to the drive lever as if they were connected together by a universal joint.

2 Claims, 5 Drawing Sheets

TORQUE DETECTOR FOR MOTOR-DRIVEN POWER STEERING SYSTEM

BACKGROUND OF THE INVENTION

The present invention relates to a motor-driven power steering system for an automobile, in particular, to a torque detector for such a system.

The prior art motor-driven power steering system for an automobile is so designed that the steering torque (i.e., the torque that develops on the steering wheel during the steering of a vehicle) is detected with a torque detector, with the motor being driven in response to an output signal from the detector in such a way that the steering shaft is subjected to power assist control.

FIG. 6 shows diagrammatically the composition of a motor-driven power steering system with which a torque detector is to be used. In this figure, 1 is a power steering motor, and 2 is an electromagnetic clutch mounted on the output shaft of the motor 1, with a first decelerating pinion 4 coaxially secured to the output shaft 3. A first gear wheel 5 meshing with the pinion 4 is coaxially secured to one end of an intermediate shaft 6, with a second decelerating pinion 7 being coaxially secured to the other end of the intermediate shaft 6. In FIG. 1, a pinion output shaft is shown by 9 and a second decelerating gear wheel 8 is coaxially secured to one end of the output shaft 9 and meshes with the second pinion 7. A plurality of first planetary gears 10 are coupled by pins 18 to a flange 9a formed at one end portion of the pinion output shaft. The front end portion of a torsion bar 11 is inserted into the end of the pinion output shaft, the two members being coupled by a pin 22. The rear end portion of the torsion bar 11 is inserted into a hollow portion 24 formed in the axial center of a sleeve shaft 12, the two members being coupled by a pin 23 at their rear end. A sun gear 13 is loosely fitted coaxially around the front end portion of the sleeve shaft 12 and meshes with the first planetary gears 10. The first planetary gears 10 in turn mesh with a first ring gear 15 the circumference of which is secured to a housing 21. A plurality of second planetary gears 14 are coupled by pins 19 to the side of a flange portion 12a formed in the central portion of the sleeve shaft 12. The second planetary gears 14 are not coupled to the sun gear 13 or housing 21 but mesh with a free second ring gear. A steering shaft 25 is coupled to the axial rear end portion of the sleeve shaft 12 and a steering gear (not shown) is coupled to the pinion output shaft 9 by means of a rack 17.

FIG. 7 shows an illustrative torque detector. Shown by 30 is a potentiometer type stroke sensor. A detection lever 30a on this potentiometer 30 is forced and fixed in a hole 33a at the right-hand axial end of a spool 33. A spring for holding the spool 33 on the neutral position is inserted into a receptacle 33b on the lefthand side of the spool 33 and into a hole 32 formed in the housing 21. The potentiometer 30 is secured to the housing 21 by fastening screws 36 and 37. A pin insertion hole 31 is formed in the central portion of the hole 32. An action lever pin 35 is inserted through the center of the spool 33, and the tip 35a of the pin 35 engages a cutout 16a formed in a selected portion of the circumference of the second ring gear 16. In the torque detector having the composition described above, the action lever pin 35 is driven either rightward or leftward together with the second ring gear 16, and in response to this movement, the spool 33 and detection lever 30a make either a rightward or a leftward movement.

The operation of the prior art torque detector will proceed as follows. Suppose here the case that with a load torque being transmitted to the pinion shaft 9 via the steering gear (not shown) and rack 17, the steering wheel is handled to have a steering torque act on the steering shaft 25.

(a) If the steering torque is smaller than the load torque, the steering torque on the wheel is transmitted to the input end (right-hand end) of the sleeve shaft 12 whereas the load torque is exerted on the pinion shaft 9. As a result, the torque detecting torsion bar 11 undergoes a torsional deformation that is proportional to the difference between the two torques. In response to this torsional deformation, the second planetary gears 14 which are coupled to the flange portion 12a of the sleeve shaft 12 by pins 19 will tend to effect a rotational displacement by rotating the sun gear 13 that meshes with them. However, since the sun gear 13 engages the pinion shaft 9 via the first planetary gears 10 and the load torque acting on this pinion shaft 9 is greater than the steering torque, the pinion shaft 9 is locked so as to prohibit the rotation of the first planetary gears 10 and hence the sun gear 13. Therefore, the second planetary gears 14 will cause a rotational displacement of the second ring gear 16. As a result, the action lever pin 35 which is in engagement with the second ring gear 16 is also displaced in the direction in which said ring gear is rotated. In synchronism with this displacement of the lever pin 35, the detection lever 30a on the potentiometer 30 is driven to be displaced in the same direction. Consequently, the torsional deformation of the torsion bar 11 proportional to the steering torque is finally converted to a stroke displacement of the potentiometer. If this stroke displacement is picked up in the form of an electrical the torque detector produces linear characteristics in that the resulting electrical output is proportional to the steering torque.

(b) If the steering torque is very small, it will not produce any torsional deformation of the torsion bar 11 that will eventually cause a rotational displacement of the second ring gear 16, and this makes the detection of the steering torque impossible. Therefore, the torque detector has a dead zone in the range where the steering torque is too small to produce a torsional deformation of the torsion bar 11.

(c) If the steering torque is excessive, its detection is also impossible because the stroke of the action lever pin 35 is restricted by the inside diameter of the pin insertion hole 31 and detection of any steering torque that corresponds to that deformation of the torsion bar which exceeds this range is theoretically impossible. In other words, there is also an upper limit for the detection of steering torque.

FIG. 8 shows a modeling of the response characteristics of the prior art torque detector that summarizes the discussion made in (a) to (c).

This prior art torque detector has the following disadvantages:

(1) Linearity in its output characteristics is not attainable over a broad operating range;

(2) Being of the potentiometer type, the detector is subject to variations in contact resistance due to such factors as eccentricity of the axial center that may occur during assembly or in other situations and the resulting drift in output signals will cause variations in the output of the detector;

(3) Since the detection lever 30a on the potentiometer 30 is forced and fixed in the hole 33a to have engagement with the spool 33, any offset in the center of the hole 33a that is introduced during working will cause the detection lever 30a to be driven eccentrically; if the amount of this offset is great, malfunctioning of the detector will occur and even if the amount of offset is small, both the lever 30a and the housing 21 will wear excessively to cause troubles such as poor brush contact, leading to reduced reliability of the torque detector.

SUMMARY OF THE INVENTION

An object, therefore, of the present invention is to provide a torque detector for a motor-driven power steering system that produces linearity over a broad range of its output and which has improved reliability in its operation.

Another object of the present invention is to provide a torque detector for a motor-driven power steering system which has a fail-safe capability in addition to the features mentioned above.

The first object of the present invention can be attained by connecting a drive lever in engagement with the second ring gear to a detection lever on the potentiometer via a spool, with the pin supported in the spool being connected to the detection lever as if they were coupled together by a universal joint.

The second object of the present invention can be attained by additionally providing the potentiometer with two detector units each consisting of a brush and a film resistor.

In accordance with the first aspect of the present invention, an eccentricity in the axial center of the pin in the spool will not cause the detection lever to be driven eccentrically since the pin is coupled to the detection lever in the potentiometer as if they were connected by a universal joint. This ensures smooth contact between the brush and resistor in the potentiometer.

In accordance with the second aspect of the present invention, two detector units each consisting of a brush and a film resistor are provided in the potentiometer and this furnishes the detection system with a fail-safe capability since a malfunctioning detector unit can be backed up with the other unit which is operating normally.

DESCRIPTION OF THE PREFERRED EMBODIMENTS OF THE INVENTION

Figure 1:
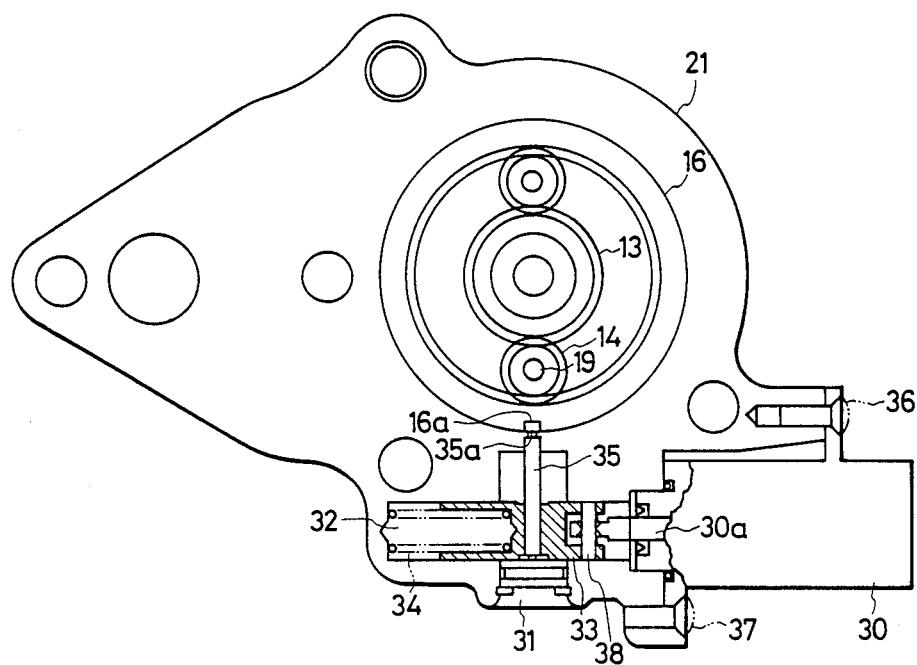
FIG. 1 is a side view, with part taken away, of a motor-driven power steering system furnished with a torque detector of the present invention.
Figure 2:
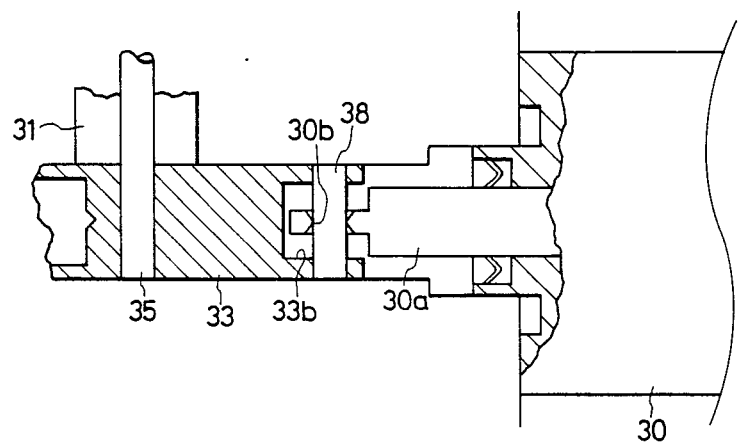
FIG. 2 is a cross-sectional view of coupling between a spool and an action lever.
Figure 7:
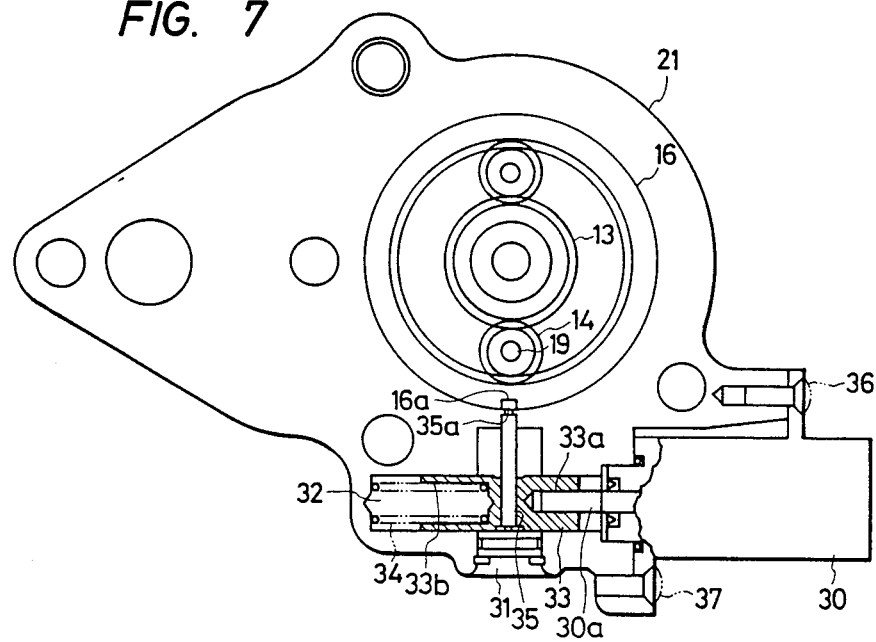
FIG. 7 is a partial fragmentary side view of a motor-driven power steering system furnished with a prior art torque detector.
Figure 8:
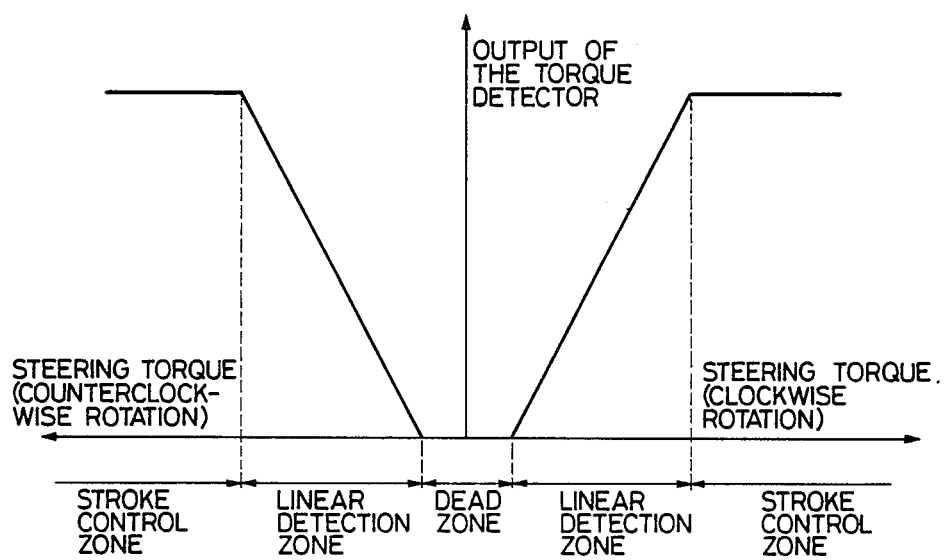
FIG. 8 is a graph showing a modeling of the output characteristics of the prior art torque detector.

The two preferred embodiments of the torque detector of the present invention are hereinafter described with reference to the accompanying drawings. FIG. 1 is a side view of a motor-driven power steering system, with part of a torque detector according to the first aspect of the present invention being taken away. FIG. 2 is a partial cross section of the essential part of the torque detector. As shown, a pin 38 is supported in a recess 33b formed at the right-hand end of a spool 33 and through which the pin is inserted perpendicularly. The pin 38 is coupled to the tip of a detection lever 30a in a potentiometer 30 by means of a pin. Details of the coupling between the pin 38 and the detection lever 30a are shown enlarged in FIG. 3. The detection lever 30a has a pin hole 30b that is flared in both the upward and downward directions and is provided with chamfered surfaces 30c. These chamfered surfaces enable the pin 38 and detection lever 30a to be coupled as if they were connected together by a universal joint. The other components of the system shown in FIG. 1 are identified by the same numerals as those used in FIG. 7 and need not be explained in detail.

Figure 3A:
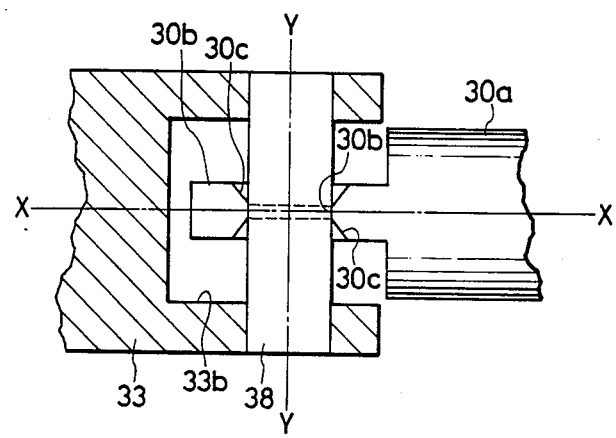
FIG. 3(a) is a cross section showing in detail the coupling between a pin and the action lever.
Figure 3B:
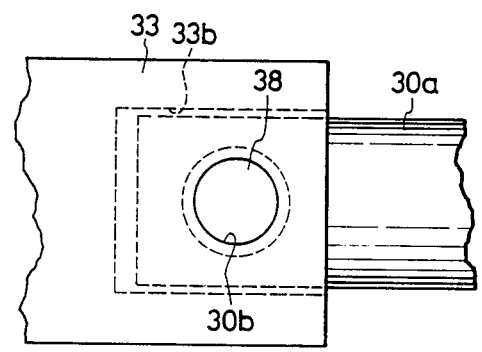
FIG. 3(b) is a plan view of the coupling shown in FIG. 3(a)

The torque detector according to the first aspect of the present invention which has the composition described above offers the advantage that even if the pin 38 is offset with respect to the spool 33 or even if an eccentricity introduced in the recess 33b in the spool 33 during working causes the pin 38 to be offset from the Y—Y axis shown in FIG. 3, the detection lever 30a on the potentiometer 30 will remain in alignment with the X—X axis. This eliminates the chance of various troubles, such as poor brush contact, of occurring in the potentiometer and provides the torque detector with higher durability and reliability.

Figure 4A:
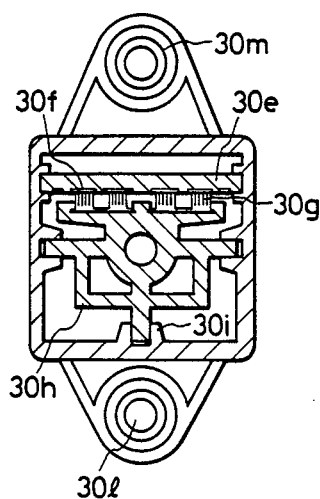
FIG. 4(a) is a cross section of the interior of a potentiometer as seen from the front.
Figure 4B:
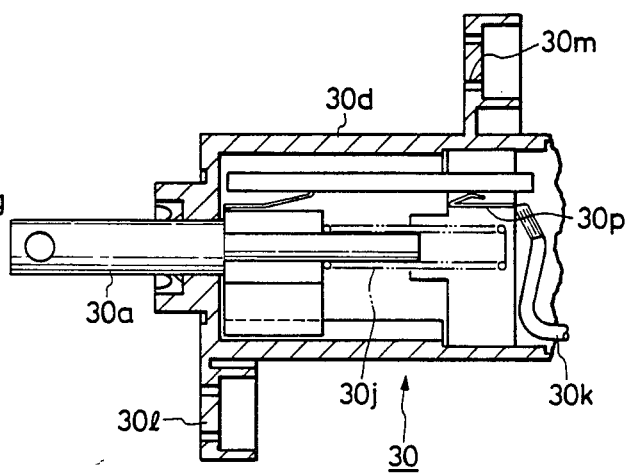
FIG. 4(b) is a longitudinal section of the interior of a potentiometer shown in FIG. 4(a)
Figure 5:
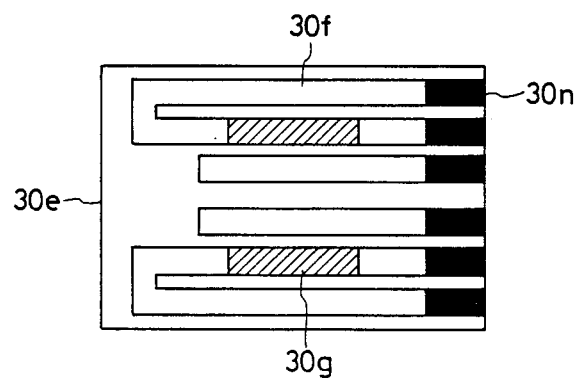
FIG. 5 is a front view of a brush connected to a film capacitor.
Figure 6:
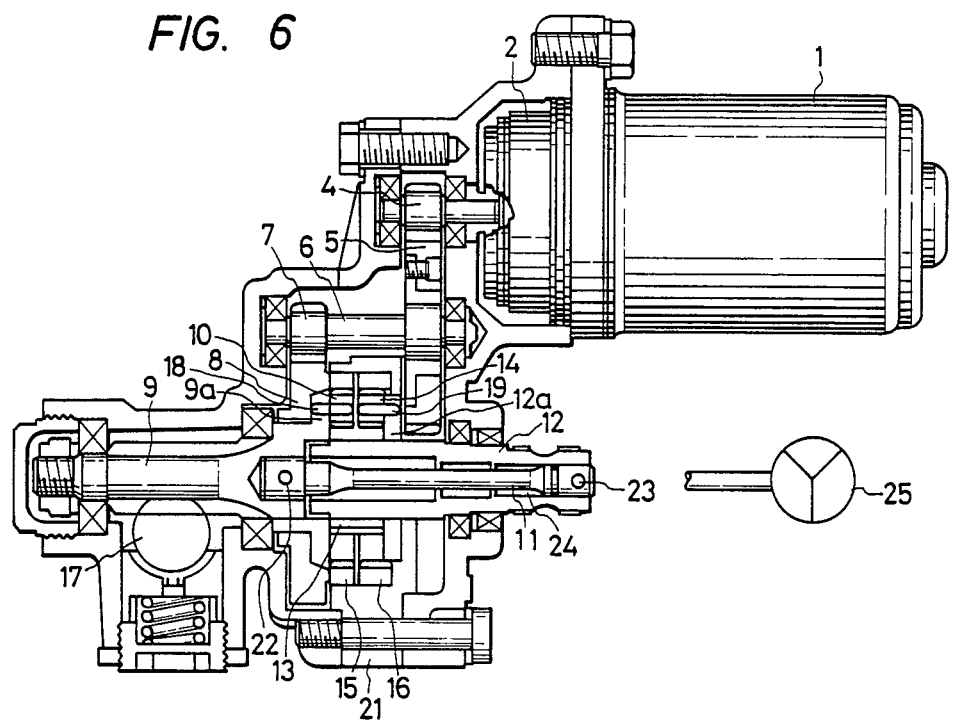
FIG. 6 shows diagrammatically the composition of a prior art motor-driven power steering system with which a torque detector is to be used.

FIGS. 4(a), (b) and 5 show the preferred embodiment of a potentiometer 30 in the torque detector according to the second aspect of the present invention. Shown by 30g is a brush, and 30f is a film resistor that establishes electrical contact with the brush 30g. The potentiometer 30 employs two detector units each consisting of the brush 30g and the film resistor 30f. Shown by 30d is the housing of the potentiometer 30; 30e is a substrate on which the film resistors 30f are formed; 30h is a brush holder which is coaxial with the detection lever 30a and is axially movable along a guide member 30i; 30j is a return spring that retains the brush holder 30h in a neutral position; 30n is a connector between the film resistor 30f and a lead pin; 30k is a lead wire; 30l and 30m are portions by which the potentiometer 30 is installed.

The potentiometer 30 having the composition described above has the advantage that it furnishes the detection system with a fail-safe capability in that even if one of the two detector units malfunctions due to troubles such as poor brush contact, correct detection can be achieved using the other unit.

As described above, according to the first aspect of the present invention, the drive lever in engagement with the second ring gear is coupled to the detection lever on the potentiometer via a spool and the pin supported in the spool is coupled to the detection lever as if they were connected by a universal joint. This ensures smooth contact between the brush and film resistor in the potentiometer. According to the second aspect of the present invention, the potentiometer is further furnished with a fail-safe capability presented by the use of two detector units each consisting of a brush and a resistor. Therefore, the present invention provides a torque detector for a motor-driven power steering system that has improved durability and reliability and which linearity in output characteristics over a broader operating range.

What is claimed is:

1. In a torque detector for a motor-driven power steering system which comprises a power assisting motor, an electromagnetic clutch mounted on the output shaft of the motor, a decelerating first pinion that is coupled to said output shaft by the electromagnetic clutch and which is coaxially secured to said output shaft, a first gear wheel engaging said pinion, an intermediate shaft for securing said gear wheel coaxially at one end thereof, a second pinion that is coaxially secured to the other end o: the intermediate shaft, a pinion shaft that coaxially secures at one end thereof a second gear wheel that engages said second pinion, a plurality of first planetary gears that are coupled by pins to a flange formed at one end portion of the pinion shaft, a torsion bar one end of which is inserted into said pinion shaft and coupled to the pinion shaft via a pin, a hollow sleeve shaft having the torsion bar mounted in the central portion thereof and which is coupled to said torsion bar at an axial end thereof via a pin, a sun gear that is loosely fitted coaxially around the sleeve shaft and which engages said first planetary gears, a plurality of second planetary gears that are coupled by pins to one side of a flange portion formed around the sleeve shaft and which engage the sun gear, a first ring gear the inner teeth of which engage said first planetary gears and the outer circumference of which is secured to a housing, a second ring gear the inner teeth of which engage the second planetary gears and the outer circumference of which is not secured to said housing, a steering shaft that is coupled to an axial end of said sleeve shaft, and a steering gear that is coupled to said pinion shaft by means of a rack, the improvement wherein an action lever pin that engages the outer circumference of said second ring gear and a detection lever on a potentiometer for detecting a linear displacement of said action lever pin are connected via a spool, and a pin supported in said spool is coupled to said detection lever, wherein said detection lever has a pin hole that is flared at an upper opening portion and at a lower opening portion so as to serve as a universal coupling between said detection lever and said pin.

2. A torque detector according to claim 1, further wherein said potentiometer includes two detector units each consisting of a brush and a film resistor.

* * * * *